(12) United States Patent
Stark et al.

(10) Patent No.: US 11,030,030 B2
(45) Date of Patent: Jun. 8, 2021

(54) ENHANCED ADDRESS SPACE LAYOUT RANDOMIZATION

(71) Applicant: Intel Corporation, Santa Clara, CA (US)

(72) Inventors: Tomer Stark, Nesher (IL); Ron Gabor, Hertzliya (IL); Joseph Nuzman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 16/259,736

(22) Filed: Jan. 28, 2019

(65) Prior Publication Data

US 2019/0235938 A1 Aug. 1, 2019

Related U.S. Application Data

(63) Continuation of application No. 15/201,443, filed on Jul. 2, 2016, now Pat. No. 10,191,791.

(51) Int. Cl.
*G06F 11/00* (2006.01)
*G06F 11/07* (2006.01)
*G06F 12/14* (2006.01)
*G06F 12/06* (2006.01)

(52) U.S. Cl.
CPC ........ *G06F 11/073* (2013.01); *G06F 11/0727* (2013.01); *G06F 12/0623* (2013.01); *G06F 12/14* (2013.01); *G06F 2212/1052* (2013.01); *G06F 2212/657* (2013.01)

(58) Field of Classification Search
CPC ............... G06F 11/073; G06F 11/0727; G06F 11/0751; G06F 11/0772; G06F 11/3037; G06F 12/0623; G06F 12/14; G06F 2212/1052; G06F 2212/657
See application file for complete search history.

(56) References Cited

U.S. PATENT DOCUMENTS

| 9,607,038 | B2* | 3/2017 | Byrne | G06F 40/194 |
| 2008/0028180 | A1 | 1/2008 | Newman et al. | |
| 2011/0167195 | A1* | 7/2011 | Scales | G06F 11/2038 711/6 |
| 2012/0144480 | A1* | 6/2012 | Miller | G06F 21/6218 726/22 |

(Continued)

OTHER PUBLICATIONS

International Search Report and Written Opinion for International Application No. PCT/US2017/035784 dated Sep. 12, 2017, 14 pgs.

*Primary Examiner* — Joseph D Manoskey
(74) *Attorney, Agent, or Firm* — Alliance IP, LLC (57) ABSTRACT

One embodiment provides an apparatus. The apparatus includes a linear address space, metadata logic and enhanced address space layout randomization (ASLR) logic. The linear address space includes a metadata data structure. The metadata logic is to generate a metadata value. The enhanced ASLR logic is to combine the metadata value and a linear address into an address pointer and to store the metadata value to the metadata data structure at a location pointed to by a least a portion of the linear address. The address pointer corresponds to an apparent address in an enhanced address space. A size of the enhanced address space is greater than a size of the linear address space.

21 Claims, 4 Drawing Sheets

(56) References Cited

U.S. PATENT DOCUMENTS

| | | | |
|---|---|---|---|
| 2013/0036332 A1* | 2/2013 | Gove | G06F 21/52 |
| | | | 714/54 |
| 2013/0080790 A1 | 3/2013 | Pean et al. | |
| 2013/0145177 A1 | 6/2013 | Cordella et al. | |
| 2014/0020112 A1* | 1/2014 | Goodes | G06F 9/5016 |
| | | | 726/26 |
| 2014/0041033 A1 | 2/2014 | Durham et al. | |
| 2014/0283056 A1 | 9/2014 | Bachwani et al. | |
| 2016/0092675 A1* | 3/2016 | Vidrine | G06F 12/0284 |
| | | | 726/22 |
| 2017/0286674 A1* | 10/2017 | Gathala | G06F 3/0683 |

* cited by examiner

ENHANCED ADDRESS SPACE LAYOUT RANDOMIZATION

FIELD

The present disclosure relates to address space layout randomization, in particular to, enhanced address space layout randomization.

BACKGROUND

Address space layout randomization (ASLR) is a mechanism to improve software security. ASLR is configured to make it more difficult for an attacker to predict target addresses. For example, in order to execute a return-to-libc attack, code to be executed must be located prior to the attack. In another example, the stack must be located in attacks configured to inject shell code on the stack. Thus, for an attack to be successful, an attacker must determine where the code and/or stack is located.

Without ASLR, each library, stack and/or heap may be placed at a respective same address whenever they are launched, allowing an attacker to "learn" and thus to predict a likely address. With ASLR, rather than consistently arranging address space positions of an application, stack, heap and/or library, the respective address space positions are randomized each time memory is allocated for the application, stack, heap and/or library. Effectiveness of the randomization is related to a size of the linear address space.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

ASLR is configured to reduce a likelihood of an attacker determining a location of a memory object based, at least in part, on knowledge of a prior location of the memory object. Effectiveness of ASLR may be improved by increasing entropy, e.g., increasing a size of a search space. Thus, entropy may be increased, for example, by increasing a size of a linear (i.e., virtual) address space. Linear memory (and linear address space) correspond to virtual memory, an abstraction configured to facilitate utilizing physical memory and/or storage by one or more applications. The size of the linear address space is related to a size in bits of linear addresses associated with the linear address space. The number of linear address bits and, thus, a size of the linear address space, may be constrained by processor configuration, instruction set architecture (ISA) and/or operating system (OS) characteristics.

An address pointer, i.e., a pointer to a linear address, may include more bits than are actually used for addressing linear memory. For example, an address pointer may include 64 bits and a linear address may include 48 bits. In other words, although the address pointer includes 64 bits, processor circuitry, address bus, etc., may be configured to accommodate 48 bits. Higher order bits, e.g., bits 48 through 63 of the address pointer may generally be "canonical", meaning the higher order bits may be set equal to the value of bit 47.

A linear address space is generally configured to include a user portion and a portion reserved for the operating system ("OS portion"). For a 48-bit linear address, in most cases, the most significant linear address bit, i.e., bit 47, equal to zero corresponds to the user portion and bit 47 equal to one corresponds to the OS portion. Thus, the user portion of the linear address space may include 128 terabytes (TB) and the OS portion of the linear address space may include 128 TB of memory.

The following describes a 64-bit address pointer and a 48-bit linear address. Address pointers and linear addresses of other bit lengths may be used, within the scope of the present disclosure.

Generally, this disclosure relates to enhanced address space layout randomization (ASLR). An apparatus, method and/or system are configured to utilize one or more higher order bits in an address pointer to provide enhanced ASLR, i.e., an illusion of ASLR over an apparent address space that is greater in size than the user portion of the linear address space. The apparent address space includes the user linear address space plus at least a portion of a "non-canonical hole". The non-canonical hole corresponds to address pointers with one or more higher order bits that are not equal to the value of bit 47. At least a portion of the higher order bits may be set to a metadata value that may then be used to enhance ASLR, as will be described in more detail below.

Utilizing the higher order bits in the address pointer is configured to enhance ASLR by increasing entropy. In other words, although an application, a stack, a heap and one or more libraries are actually stored in user memory in linear memory objects, associated linear addresses may be enhanced by metadata values associated with higher order address bits in a corresponding address pointer. The metadata values may then be randomized alternatively with, and/or in addition, to randomizing the associated linear addresses. The apparent ("enhanced") memory addresses may then be spread over an enhanced address space that is larger than the linear address space. For example, for a 6 bit metadata value, a size of the apparent memory address space is 64 times a size of the linear address space. Thus, entropy is increased.

Metadata values may be stored in a metadata data structure configured to associate one or more metadata values with one or more linear addresses, and thus memory objects. The metadata data structure may be allocated in linear memory and a metadata base pointer that points to a base address of the metadata data structure may be stored in, e.g., a processor register. The metadata data structure may include one or more levels. For example a two-level metadata data structure may include a metadata directory and one or more metadata tables, as will be described in more detail below.

One or more bits of a linear address may be utilized as an index (i.e., a linear address pointer) into the metadata data structure. The index may then point to the metadata value to be included in the higher order bits of an associated address pointer provided to, e.g., an application. The bit position in the linear address of the index may be related to a size of a memory object that is associated with the corresponding metadata value.

Allocating the metadata data structure in linear memory is configured to facilitate updating metadata values in the enhanced linear addresses by updating metadata values in the metadata data structure and/or updating metadata table pointers. The updated metadata value may then be provided to an application by providing an updated address pointer that includes the updated metadata value. In other words, changing the metadata value in the address pointer corresponds to an apparent change in storage location of a corresponding memory object.

Upon a memory access, e.g., a load, a store and/or instruction fetch operation, the metadata value included in the address pointer may be compared to the metadata value stored in the metadata data structure that is pointed to by the linear address pointer. If the metadata values do not match, then a fault may be generated. If the metadata values match then the metadata values may be stripped off and the linear address may be used to execute the memory access operation. Thus, the metadata value may be utilized for memory corruption detection.

Thus, entropy associated with ASLR may be increased for a system without increasing the size of linear addresses. The metadata values may be further utilized during memory access operations to detect memory corruption. Memory corruption may be caused, for example, by an out-of-bound access (e.g., memory access using the base address of a memory buffer and an offset that exceeds the allocated size of the buffer) or by a dangling pointer (i.e., a pointer which referenced a memory buffer that has been de-allocated).

Figure 1:
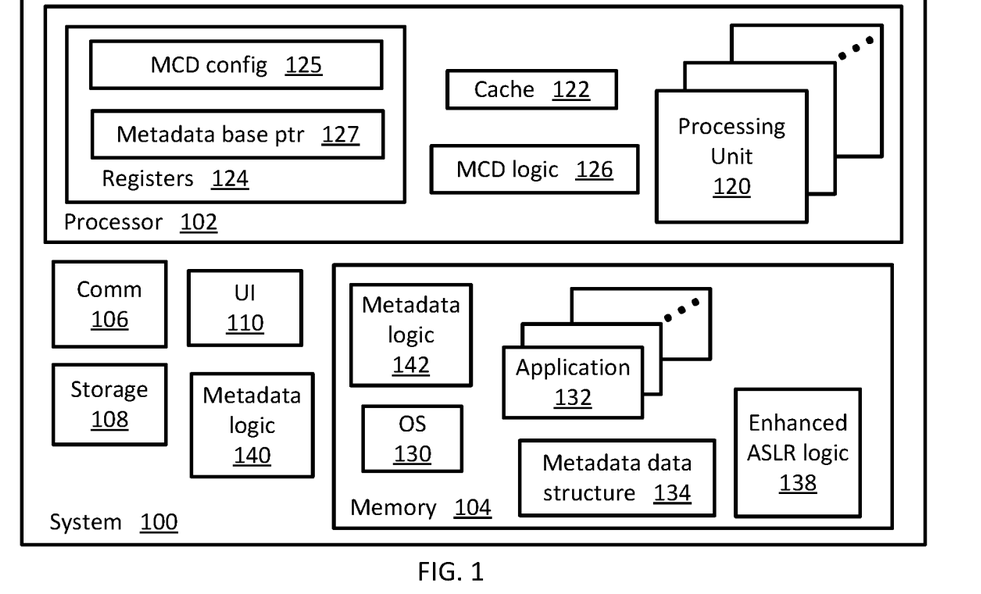
FIG. 1 illustrates a functional block diagram of a system consistent with several embodiments of the present disclosure.

FIG. 1 illustrates a functional block diagram of a system 100 consistent with several embodiments of the present disclosure. System 100 may include, but is not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc.

System 100 may include a processor 102, a memory 104, a communication interface "Comm" 106, storage 108 and/or a user interface (UI) 110. Communication interface 106 is configured to provide communication capability, wired and/or wireless, to system 100. Storage 108 may include internal and/or external storage devices including, but not limited to, hard disk drives, solid-state storage devices, etc. User interface 110 may include, but is not limited to, a user input device (e.g., keyboard, a keypad, touchpad, mouse, microphone, etc.), a display (including a touch sensitive display), etc.

Processor 102 may include one or more processing units, e.g., processing unit 120, a cache memory 122 and one or more processor registers 124. Processor 102 may include MCD (memory corruption detection) logic 126. Memory 104 may include an operating system (OS) 130, one or more applications, e.g., application 132, and metadata data structure 134. Memory 104 may further include enhanced ASLR logic 138.

System 100 may include metadata logic 140 and/or 142. For example, metadata logic 140 may be implemented in circuitry. In another example, metadata logic 142 may be implemented in logic and may be stored in memory 104. For example, the metadata logic 140 and/or 142 may correspond to random number generators (RNGs) configured to generate random or pseudorandom numbers. A number of bits in each random number may correspond to a size of a corresponding metadata value.

Processor registers 124 may be configured to store MCD configuration data 125 and a metadata base pointer 127. The MCD configuration data 125 may be set, for example, by a user. MCD configuration data 125 may include, but is not limited to, an enable/disable bit, a metadata position indicator, a metadata size and/or one or more metadata data structure parameters. The enable/disable bit is configured to enable or disable enhanced ASLR, as described herein. The metadata position indicator is configured to contain a bit position value of a least significant bit of the metadata value included in an address pointer. The bit position may be correspond to the upper (i.e., "higher order") bits. For example, the bit position may be greater than or equal to bit position 48 and less than bit position 63. The metadata size is configured to contain a size in bits of a metadata value. For example, the metadata size may be in the range of zero to fifteen to bits. A relatively larger metadata size may correspond to a relatively higher entropy.

Metadata data structure parameters may include, but are not limited to, a type indicator, a number of linear address bits to index into a metadata directory, a number of linear address bits to index into a metadata table. The type indicator is configured to indicate a number of levels, e.g., one or two, in the metadata data structure. The number of linear address bits correspond to a size of a memory object that is associated with a particular metadata value.

OS 130 may be configured to set a metadata base pointer in processor registers 124, e.g., metadata base pointer 127, if enhanced ASLR is enabled. For example, the metadata base pointer 127 may be set in response to receiving an application launch request. The metadata base pointer is configured to point to a base address (linear address) of the metadata data structure 134. Metadata data structure 134 may then be allocated utilizing the metadata base pointer 127. For example, OS 130 and/or application 132 may allocate a memory portion configured to store metadata data structure 134. The metadata data structure 134 is configured to be stored in linear memory at a base linear address pointed to by metadata base pointer 127.

Figure 2:
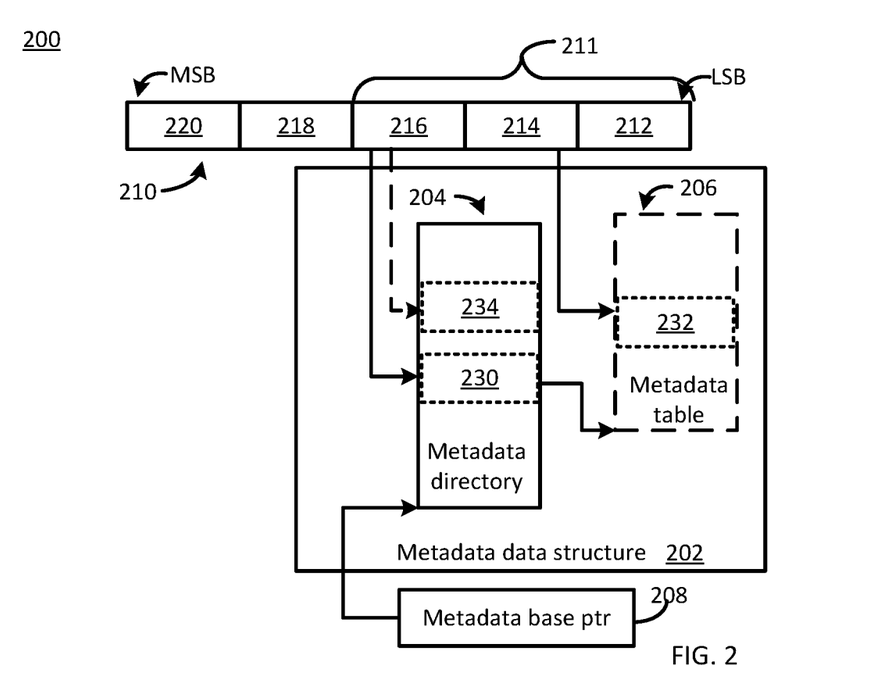
FIG. 2 is an example illustrating a metadata data structure consistent with several embodiments of the present disclosure.

FIG. 2 is an example 200 illustrating a metadata data structure 202 consistent with several embodiments of the present disclosure. Example 200 further illustrates a metadata base pointer 208 and an address pointer 210. Metadata data structure 202 is one example of metadata data structure 134 of FIG. 1. Address pointer 210 includes a plurality of address pointer fields 212, 214, 216, 218, 220. Address pointer 210 corresponds to an enhanced ASLR linear address, enhanced by address field 218 configured to contain a metadata value. Address fields 212, 214 and 216 correspond to a linear address 211. The enhanced linear address 210 corresponds to an apparent address space that is larger than the actual linear address space that may be addressed by linear address 211.

A least significant address field 212 includes a least significant bit (LSB) of address pointer 210 (and linear address 211). A most significant address field 220 includes a most significant bit (MSB) of address pointer 210. In this example 200, address field 218 may be configured to include a metadata value. For a 48-bit linear address 211 and a 64-bit address pointer 210, address field 218 may include up to 15 bits. For example, address field 218 may include six bits. In another example, address field 218 may include more than or fewer than six bits.

In one example, the least significant address field 212 may include six bits configured to address a 64-byte data block. In another example, the least significant address field 212 may include more or fewer bits configured to address a larger or smaller data block. The most significant address field 220 may include at least one bit. A number of bits included in the most significant address field 220 is related to the number of bits included in address field 218 and corresponding metadata value. For user address space, the most significant bit (MSB) of the most significant address field 220 is equal to zero in most cases.

A base address of metadata data structure 202 may be pointed to by metadata base pointer 208. Metadata base pointer 208 is one example of metadata base pointer 127 of FIG. 1. Linear address fields 214, 216 may be configured as indexes into metadata data structure 202. In other words, linear address fields 214, 216 may be configured to point to one or more metadata values stored in metadata data structure 202. Address fields 214 and 216 may each include a respective plurality of bits. A size of each address field 214, 216 is related to a configuration of metadata data structure 202.

The metadata data structure 202 may be configured as a two level or a one level data structure. The number of levels is related to enhanced ASLR granularity, i.e., a size of a memory object associated with a metadata value. A two level metadata data structure may include a metadata directory and one or more metadata tables. A one level metadata data structure may include the metadata directory.

In an embodiment, metadata data structure 202 may be configured as a two level data structure including metadata directory 204 and at least one metadata table, e.g., metadata table 206. A size of linear address field 216 may be related to a size of metadata directory 204. Metadata directory 204 may contain one or more metadata table pointers, e.g., metadata table pointer 230. Address field 216 may be utilized as an index into the metadata directory 204 and may point to a metadata table pointer, e.g., metadata table pointer 230. Each metadata table pointer, e.g., metadata table pointer 230, may point to a base address of a metadata table, e.g., metadata table 206. The linear address field 214 may then be utilized as an index, e.g., offset, into metadata table 206 and may point to a metadata value, e.g., metadata value 232. Each group of linear addresses with linear address bits corresponding to address field 214 may have a same metadata value in enhanced address field 218.

In another embodiment, metadata data structure 202 may not include metadata table 206. Thus, the metadata data structure 202 of this embodiment may be a one level metadata data structure. Metadata directory 204 may then be configured to store a plurality of metadata values, e.g., metadata value 234. Linear address field 216 may be utilized as an index into metadata directory 204. For example, linear address field 216 may point to metadata value 234. Each group of linear addresses with linear address bits corresponding to address field 216 may then have a same metadata value in enhanced address field 218.

Thus, metadata data structure 202 may be configured to provide a variety of granularities, i.e., memory object sizes, that are associated with a selected metadata value. Including metadata data structure 202 in linear memory is configured to facilitate determining and updating metadata values and randomizing enhanced linear addresses. In other words, an apparent linear address of a memory object may be changed by changing a corresponding metadata value.

Turning again to FIG. 1, in response to receiving the request to launch an application, e.g., application 132, OS 130 may allocate the metadata data structure 134. For example, the OS may set the metadata base pointer 127 that points to the metadata data structure 134, as described herein. The metadata base pointer 127 may be stored to processor registers 124, as described herein. The OS 130 may then allocate the metadata data structure 134. The type of metadata data structure may be determined based, at least in part, on the MCD configuration data 125.

A memory object configured to store at least a portion of the application 132 may then be allocated by, e.g., OS 130. The OS 130 may determine a linear address associated with the memory object. For example, the linear address may correspond to a base address of the memory object. The memory object may be configured to contain application code and/or data, a heap and/or library associated with application 132. The memory object may be allocated in memory 104 in linear address space.

A metadata value may then be generated. For example, enhanced ASLR logic 138 may be configured to trigger metadata logic 140, 142 to generate the metadata value in response to the launch of an application. Enhanced ASLR logic 138 may be configured to read MCD configuration data 125 from processor registers 124 to determine a number of bits in a metadata value. Enhanced ASLR logic 138 may then configure metadata logic 140 to provide a metadata value of a corresponding size, i.e., number of bits.

Enhanced ASLR logic 138 may then retrieve the metadata value from the metadata logic 140, 142. Enhanced ASLR logic 138 may be configured to determine a metadata position in the address pointer based, at least in part, on MCD configuration data 125. The retrieved metadata value may be associated with the application 132. The metadata value may then be combined with the linear address into a corresponding address pointer. Enhanced ASLR logic 138 may be configured to combine the metadata value and the linear address into the address pointer at the bit position defined by MCD configuration data 125.

The metadata value may then be stored to metadata data structure 134 at a location pointed to by at least a portion of the linear address, as described herein. The at least a portion of the linear address may be determined by, e.g., enhanced ASLR logic 138, based, at least in part, on metadata data structure parameters included in the MCD configuration data 125. For example, the metadata data structure parameters may include a number of linear address bits to index into a metadata directory and/or a number of linear address bits to index into a metadata table. Enhanced ASLR logic 138 may be configured to store the metadata value to the metadata data structure at a location pointed to by at least a portion of the linear address. The address pointer may then be returned and the application may launch. Thus, an address pointer associated with the allocated memory object may be generated and may include a metadata value in higher order bits.

After the application 132 has been launched, the application 132 may allocate additional memory objects configured to store, for example, a heap, a library, etc. Operations to generate, retrieve and store a metadata value and to combine the metadata value with a linear address of the allocated memory object, as described herein, may be repeated for each allocated memory object. The memory objects may be associated with, e.g., a heap and/or library. The memory objects may be allocated and a corresponding address pointer (i.e., enhanced linear address) may be generated in response to a memory allocation request by an application and/or a library. The address pointer may then be returned to the requesting application and/or library.

Thus, the OS 130, an application 132 and/or a library may manipulate metadata data structure 134. Additional metadata values may be generated and stored to metadata data structure 134 at locations pointed to by at least a portion of one or more linear addresses of allocated memory objects. The metadata values may be combined with corresponding linear addresses into corresponding address pointers. The corresponding address pointers may then be returned to the application.

Thus, each time a memory object is allocated, an associated address pointer may include a randomly generated metadata value configured to span at least a portion of the non-canonical hole, as described herein. The address pointer corresponds to an apparent address in an enhanced address space. A size of the enhanced address space is greater than a size of the linear address space.

In operation, an application, e.g., application 132, may request a memory access, e.g., a load, a store or an instruction fetch operation. The memory access request may include the address pointer provided to the application, as described herein. In response to the memory access request, the metadata value may be stripped off the address pointer by, e.g., MCD logic 126. The corresponding linear address may then be used to perform the memory access operation. Thus, while the apparent address space may be addressable by a 64-bit enhanced linear address, 48-bit linear addressing of the actual linear address space, may be preserved.

Figure 3:
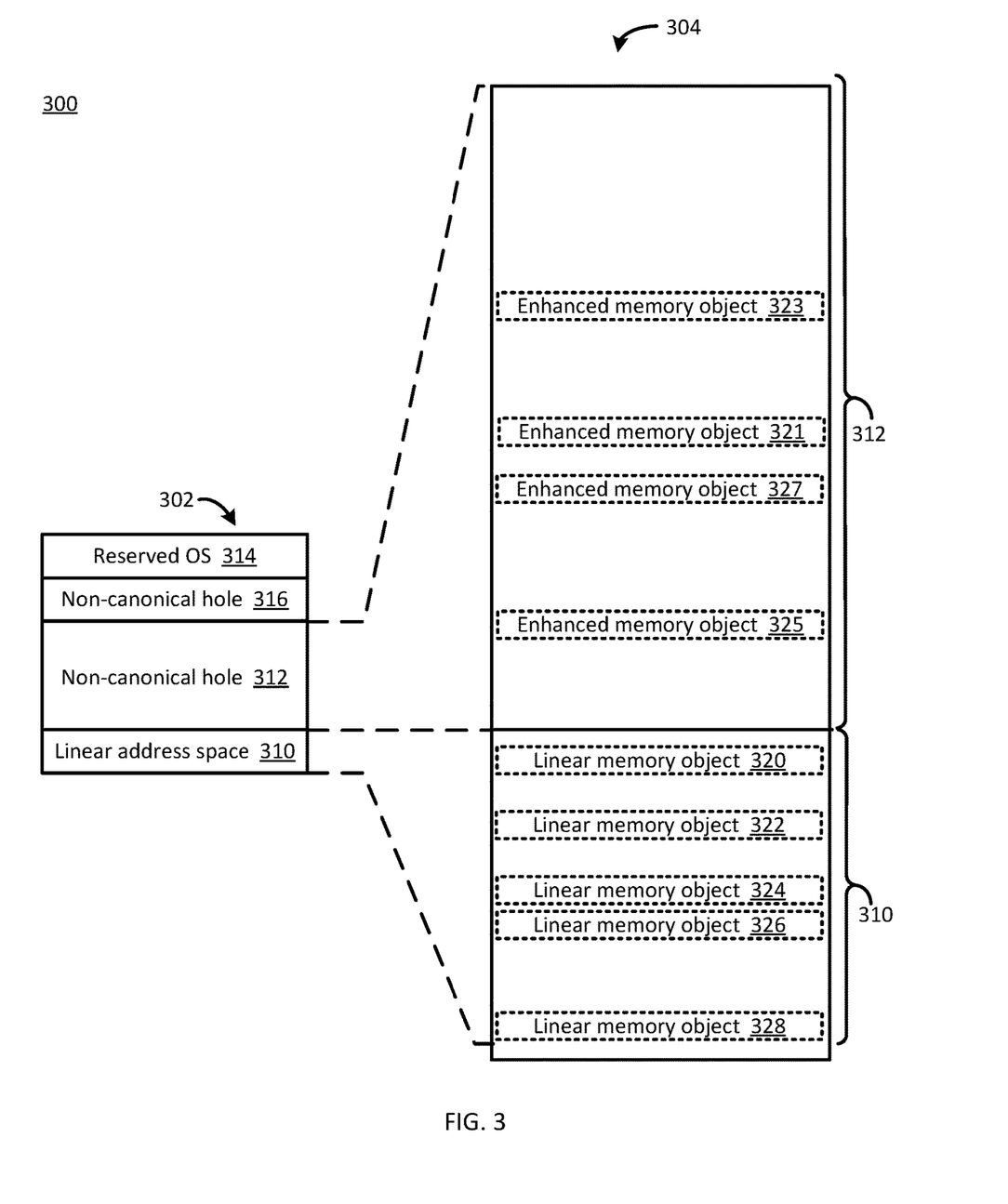
FIG. 3 illustrates memory object distribution using enhanced address space layout randomization, consistent with one embodiment of the present disclosure.

FIG. 3 illustrates memory object distribution 300 using enhanced address space layout randomization, consistent with one embodiment of the present disclosure. Memory object distribution 300 includes an actual memory structure 302 and an enhanced memory structure 304. Actual memory structure 302 includes a linear address space 310, a first non-canonical hole 312, a second non-canonical hole 316 and a reserved OS region 314. For example, for a 48-bit linear address, linear address space 310 may include 128 TB (terabytes) of user address space and 128 TB of reserved address space. The non-canonical holes 312, 316 correspond to 64-bit address pointers where bits 48 through 62 are not all zeros or all ones. The first non-canonical hole 312 corresponds to a 64-bit address pointer where the most significant bit is zero. The second non-canonical hole 316 corresponds to a 64-bit address pointer where the most significant bit is one.

Enhanced memory structure 304 illustrates actual and apparent randomized distribution of a plurality of memory objects. Enhanced memory structure 304 includes linear address space 310 and the first non-canonical hole 312. Enhanced memory structure 304 illustrates an actual distribution of memory objects, e.g., linear memory objects 320, 322, 324, 326, 328. Enhanced memory structure 304 further illustrates an apparent distribution of memory objects, e.g., enhanced memory objects 321, 323, 325, 327. For example, linear memory object 320 may correspond to a first heap, linear memory object 322 may correspond to a second heap, linear memory object 324 may correspond to an application code, linear memory object 326 may correspond to a first library and linear memory object 328 may correspond to a second library. Continuing with this example, enhanced memory object 321 may also correspond to the first heap 320, enhanced memory object 323 may correspond to the second heap 322, enhanced memory object 325 may correspond to the application code 324 and enhanced memory object 327 may correspond to the first library 326. In this example, an enhanced linear address (i.e., address pointer) and an actual linear address of linear memory object 328 may be the same. In other words, the metadata value associated with linear memory object 328 may be zero.

Thus, the apparent memory object distribution is over an apparent address space of a size greater than 128 TB of linear address space 310. For example, for a 6 bit metadata value, the apparent address space 304 may include 64×128 TB, i.e., 8192 TB. The distribution of memory objects may change each time a memory object is allocated.

The metadata may be utilized to provide memory corruption detection in addition to and/or alternatively with enhanced ASLR. In response to receiving a memory access request, the metadata value included in the address pointer associated with the memory access request may be compared to the metadata value included in the metadata data structure pointed to by the at least a portion of the linear address. If the two metadata values are the same, the memory access may be allowed. If the two metadata values are not the same, a fault may be generated.

For example, MCD logic 126 included in processor 102 may be configured to compare a metadata value included in an address pointer received from an application to a corresponding metadata value stored in a metadata data structure and pointed to by corresponding linear address bits. If the metadata values match, then the MCD logic 126 may strip off the higher order bits included in, e.g., address field 218 of FIG. 2. The remaining linear address may then be utilized to access linear address space. If the metadata values do not match, a fault may be generated by MCD logic 126 and the linear address space may not be accessed. Thus, the metadata values may be utilized for enhanced ASLR and/or memory corruption detection.

Figure 4:
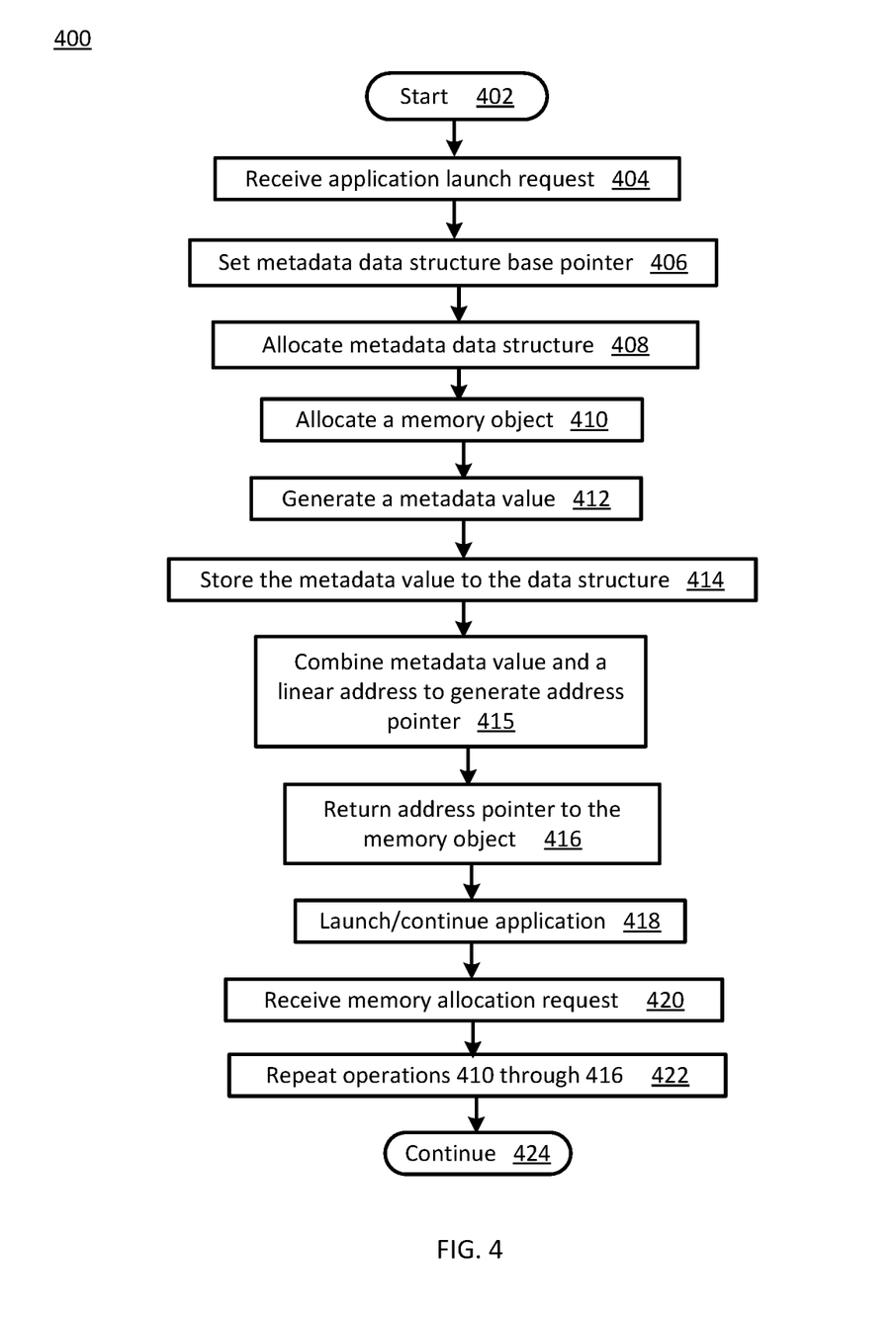
FIG. 4 is a flowchart of enhanced address space layout randomization operations according to various embodiments of the present disclosure.

FIG. 4 is a flowchart 400 of enhanced address space layout randomization operations according to various embodiments of the present disclosure. In particular, the flowchart 400 illustrates enhanced address space layout randomization utilizing metadata. The operations may be performed, for example, by OS 130, application 132 and/or enhanced ASLR logic 138 of FIG. 1.

Operations of this embodiment may begin with start 402. An application launch request may be received at operation 404. A metadata data structure base pointer may be set at operation 406. A metadata data structure may be allocated at operation 408. Operation 410 includes allocating a memory object. A linear address may correspond to a base address of the memory object. Operation 412 includes generating a metadata value. The metadata value may be stored to the metadata data structure at operation 414. The metadata value may be combined with the linear address to generate an address pointer at operation 415. The address pointer to the memory object may be returned at operation 416. The application may then be launched or continued at operation 418. A memory allocation request may be received at operation 420. For example, the memory allocation request may be received from the launched application. In some embodiments, operations 410, 412, 414, 416 may be repeated at operation 422. For example, prior to application launch, OS 130 may perform operations 410, 412, 414, 416. After application launch, the application and/or the OS may perform operations 410 through 416, for example, in response to a memory allocation request. Program flow may then continue at operation 424.

Thus, a metadata data structure may be allocated and a plurality of metadata values may generated. A metadata value may be combined with a linear address associated with a memory portion, e.g., memory object, into an address pointer. A plurality of address pointers may thus provide an apparent distribution of memory objects over an enhanced address space that is larger than the linear address space.

Figure 5:
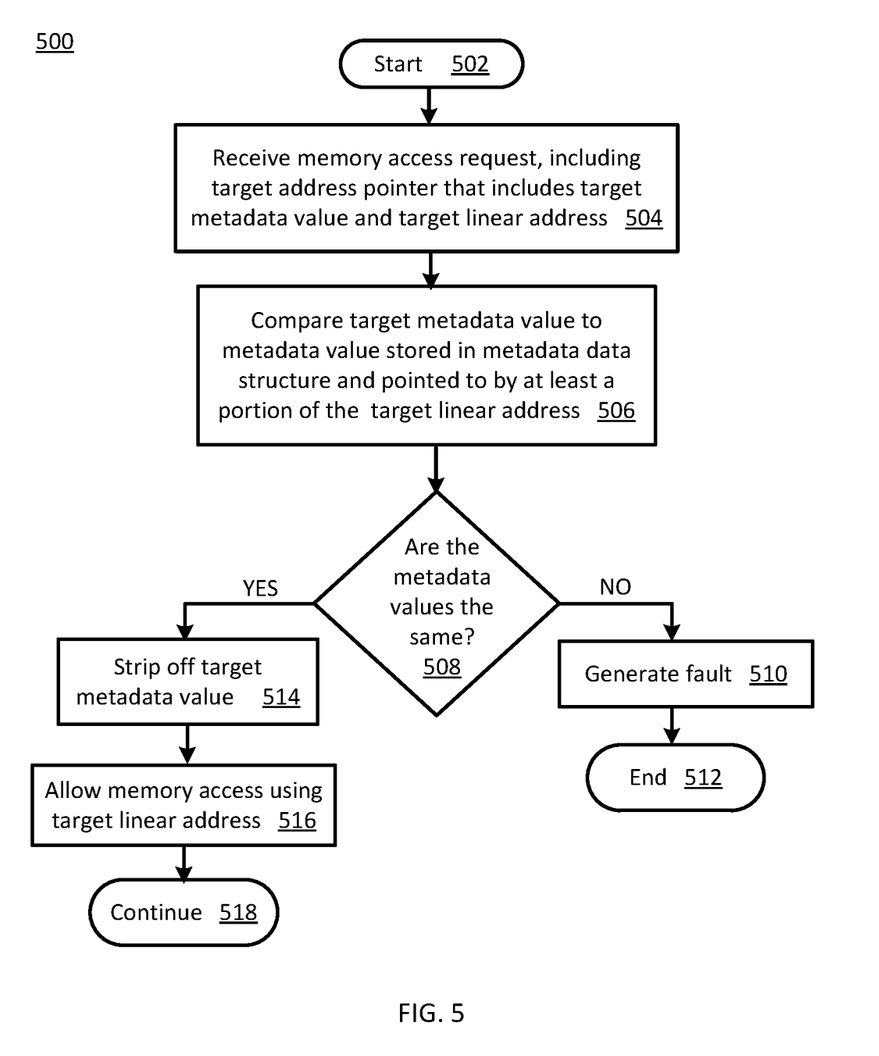
FIG. 5 is a flowchart of memory corruption detection operations according to various embodiments of the present disclosure.

FIG. 5 is a flowchart 500 of memory corruption detection operations according to various embodiments of the present disclosure. In particular, the flowchart 500 illustrates memory corruption detection utilizing metadata values in a metadata data structure and corresponding metadata values included in the upper bits of an address pointer. The operations may be performed, for example, by OS 130 and/or MCD logic 126 of FIG. 1.

Operations of this embodiment may begin with start 502. A memory access request including a target address pointer that includes a target metadata value and a target linear address may be received at operation 504. The target metadata value may be compared to a metadata value stored in the metadata data structure and pointed to by at least a portion of the target linear address at operation 506. Whether the target metadata value and the stored metadata value are the same may be determined at operation 508. If the metadata values are the same, the target metadata value may be stripped off the address pointer at operation 514. Memory access may be allowed using the target linear address at operation 516. Program flow may continue in operation 518. If the metadata values are not the same, a fault may be generated at operation 510. Program flow may then end at operation 512.

Thus, memory corruption may be detected utilizing target metadata values included address pointers and metadata values stored in metadata data structure 134. Thus, the metadata values may be utilized for enhanced ASLR and/or memory corruption detection.

While the flowcharts of FIGS. 4 through 5 illustrate operations according various embodiments, it is to be understood that not all of the operations depicted in FIGS. 4 through 5 are necessary for other embodiments. In addition, it is fully contemplated herein that in other embodiments of the present disclosure, the operations depicted in FIGS. 4 and/or 5 and/or other operations described herein may be combined in a manner not specifically shown in any of the drawings, and such embodiments may include less or more operations than are illustrated in FIGS. 4 through 5. Thus, claims directed to features and/or operations that are not exactly shown in one drawing are deemed within the scope and content of the present disclosure.

Thus, an apparatus, method and/or system are configured to utilize one or more higher order bits in an address pointer to enhance ASLR over an apparent address space that is greater in size than the user portion of the linear address space. Although an application, a stack, a heap and one or more libraries are actually stored in user memory in linear memory objects, associated linear addresses may be enhanced by metadata values in higher order address bits in a corresponding address pointer. Each metadata value may then be randomized alternatively with, and/or in addition, to randomizing an associated linear address.

Metadata values may be stored in a metadata data structure configured to associate one or more metadata values with one or more linear addresses, and thus memory objects. The metadata data structure may be allocated in linear memory and a metadata base pointer that points to a base address of the metadata data structure may be stored in, e.g., a processor register. The metadata data structure may include one or more levels.

Allocating the metadata data structure in linear memory is configured to facilitate updating metadata values in the enhanced linear addresses by updating metadata values in the metadata data structure and/or updating metadata table pointers. The updated metadata value may then be provided to an application by providing an updated address pointer that includes the updated metadata value. In other words, changing the metadata value in the address pointer corresponds to an apparent change in storage location of a corresponding memory object.

Thus, entropy associated with ASLR may be increased for a system without increasing the size of linear addresses. The metadata values may be utilized during memory access operations to detect memory corruption and/or to support enhanced ASLR, as described herein.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) 130 may be configured to manage system resources and control tasks that are run on, e.g., system 100. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units.

Memory 104 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for System Verilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or System Verilog standards.

EXAMPLES

Examples of the present disclosure include subject material such as a method, means for performing acts of the method, a device, or of an apparatus or system related to enhanced address space layout randomization, as discussed below.

Example 1

According to this example, there is provide an apparatus. The apparatus includes a linear address space, metadata logic and enhanced address space layout randomization (ASLR) logic. The linear address space includes a metadata data structure. The metadata logic is to generate a metadata value. The enhanced ASLR logic is to combine the metadata value and a linear address into an address pointer and to store the metadata value to the metadata data structure at a location pointed to by a least a portion of the linear address. The address pointer corresponds to an apparent address in an enhanced address space. A size of the enhanced address space is greater than a size of the linear address space.

Example 2

This example includes the elements of example 1, and further includes memory corruption detection (MCD) logic to compare a target metadata value in a target address pointer including the linear address to the metadata value stored to the metadata data structure and to generate a fault if the target metadata value and the stored metadata value are not the same.

Example 3

This example includes the elements of example 1, wherein the metadata data structure is two level.

Example 4

This example includes the elements of example 1, wherein the metadata value is included in one or more upper bits of the address pointer.

Example 5

This example includes the elements according to any one of examples 1 through 4, wherein the metadata value is a random number.

Example 6

This example includes the elements according to any one of examples 1 through 4, wherein the linear address includes 48 bits and the address pointer includes 64 bits.

Example 7

This example includes the elements according to any one of examples 1 through 4, wherein the metadata data structure includes a metadata directory and a metadata table.

Example 8

According to this example, there is provided a method. The method includes generating, by metadata logic, a metadata value; combining, by enhanced address space layout randomization (ASLR) logic, the metadata value and a linear address into an address pointer; and storing, by the enhanced ASLR logic, the metadata value to a metadata data structure at a location pointed to by a least a portion of the linear address. The metadata data structure is included in a linear address space. The address pointer corresponds to an apparent address in an enhanced address space. A size of the enhanced address space is greater than a size of the linear address space.

Example 9

This example includes the elements of example 8, and further includes comparing, by memory corruption detection (MCD) logic, a target metadata value in a target address pointer including the linear address to the metadata value stored to the metadata data structure; and generating, by the MCD logic, a fault if the target metadata value and the stored metadata value are not the same.

Example 10

This example includes the elements of example 8, wherein the metadata data structure is two level.

Example 11

This example includes the elements of example 8, wherein the metadata value is included in one or more upper bits of the address pointer.

Example 12

This example includes the elements of example 8, wherein the metadata value is a random number.

Example 13

This example includes the elements of example 8, wherein the linear address includes 48 bits and the address pointer includes 64 bits.

Example 14

This example includes the elements of example 8, wherein the metadata data structure includes a metadata directory and a metadata table.

Example 15

According to this example, there is provided a system. The system includes a processor, a linear address space, metadata logic and enhanced address space layout randomization (ASLR) logic. The processor includes at least one processor register. The linear address space includes a metadata data structure. The metadata logic is to generate a metadata value. The enhanced ASLR logic is to combine the metadata value and a linear address into an address pointer and to store the metadata value to the metadata data structure at a location pointed to by a least a portion of the linear address. The address pointer corresponds to an apparent address in an enhanced address space. A size of the enhanced address space is greater than a size of the linear address space.

Example 16

This example includes the elements of example 15, and further includes memory corruption detection (MCD) logic to compare a target metadata value in a target address pointer including the linear address to the metadata value stored to the metadata data structure and to generate a fault if the target metadata value and the stored metadata value are not the same.

Example 17

This example includes the elements of example 15, wherein the metadata data structure is two level.

Example 18

This example includes the elements of example 15, wherein the metadata value is included in one or more upper bits of the address pointer.

Example 19

This example includes the elements according to any one of examples 15 through 18, wherein the metadata value is a random number.

Example 20

This example includes the elements according to any one of examples 15 through 18, wherein the linear address includes 48 bits and the address pointer includes 64 bits.

Example 21

This example includes the elements according to any one of examples 15 through 18, wherein the metadata data structure includes a metadata directory and a metadata table.

Example 22

This example includes the elements according to any one of examples 15 through 18, wherein the at least one processor register is to store a metadata base pointer.

Example 23

This example includes the elements according to any one of examples 15 through 18, wherein the at least one processor register is to store memory corruption (MCD) configuration data.

Example 24

This example includes the elements of example 23, wherein the MCD configuration data includes one or more of an enable/disable bit, a metadata position indicator, a metadata size and/or one or more metadata data structure parameters.

Example 25

This example includes the elements of example 24, wherein the metadata data structure parameter is selected from the group including one of more of a type indicator, a number of linear address bits to index into a metadata directory, a number of linear address bits to index into a metadata table.

Example 26

According to this example, there is provided a computer readable storage device. The device has stored thereon instructions that when executed by one or more processors result in the following operations including: generating a metadata value; combining the metadata value and a linear address into an address pointer; and storing the metadata value to a metadata data structure at a location pointed to by a least a portion of the linear address. The metadata data structure is included in a linear address space. The address pointer corresponds to an apparent address in an enhanced address space. A size of the enhanced address space is greater than a size of the linear address space.

Example 27

This example includes the elements of example 26, wherein the instructions that when executed by one or more processors results in the following additional operations including comparing a target metadata value in a target address pointer including the linear address to the metadata value stored to the metadata data structure; and generating a fault if the target metadata value and the stored metadata value are not the same.

Example 28

This example includes the elements of example 26, wherein the metadata data structure is two level.

Example 29

This example includes the elements of example 26, wherein the metadata value is included in one or more upper bits of the address pointer.

Example 30

This example includes the elements according to any one of examples 26 through 29, wherein the metadata value is a random number.

Example 31

This example includes the elements according to any one of examples 26 through 29, wherein the linear address includes 48 bits and the address pointer includes 64 bits.

Example 32

This example includes the elements according to any one of examples 26 through 29, wherein the metadata data structure includes a metadata directory and a metadata table.

Example 33

According to this example, there is provided a device. The device includes means for generating, by metadata logic, a metadata value; means for combining, by enhanced address space layout randomization (ASLR) logic, the metadata value and a linear address into an address pointer; and means for storing, by the enhanced ASLR logic, the metadata value to a metadata data structure at a location pointed to by a least a portion of the linear address. The metadata data structure id included in a linear address space. The address pointer corresponds to an apparent address in an enhanced address space. A size of the enhanced address space is greater than a size of the linear address space.

Example 34

This example includes the elements of example 33, and further includes means for comparing, by memory corruption detection (MCD) logic, a target metadata value in a target address pointer including the linear address to the metadata value stored to the metadata data structure; and means for generating, by the MCD logic, a fault if the target metadata value and the stored metadata value are not the same.

Example 35

This example includes the elements of example 33, wherein the metadata data structure is two level.

Example 36

This example includes the elements of example 33, wherein the metadata value is included in one or more upper bits of the address pointer.

Example 37

This example includes the elements according to any one of examples 33 through 36, wherein the metadata value is a random number.

Example 38

This example includes the elements according to any one of examples 33 through 36, wherein the linear address includes 48 bits and the address pointer includes 64 bits.

Example 39

This example includes the elements according to any one of examples 33 through 36, wherein the metadata data structure includes a metadata directory and a metadata table.

Example 40

According to this example, there is provided a system. The system includes at least one device arranged to perform the method of any one of examples 8 to 14.

Example 41

According to this example, there is provided a device. The device includes means to perform the method of any one of examples 8 to 14.

Example 42

According to this example, there is provided a computer readable storage device. The device has stored thereon instructions that when executed by one or more processors result in the following operations including: the method according to any one of examples 8 through 14.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An enhanced address space memory corruption detection apparatus, comprising:
   memory circuitry to provide a linear address space that includes a metadata data structure;
   metadata circuitry to receive a memory access request that includes a target address pointer comprising a target metadata value and target linear address; and
   metadata comparison circuitry to compare the target metadata value to a metadata value stored in the metadata data structure at a location pointed to by at least a portion of the target linear address;
   wherein the metadata circuitry is further to, responsive to a determination that the target metadata value and the stored metadata value are identical, grant the memory access request to allow access to the target linear address.

2. The apparatus of claim 1, wherein the metadata circuitry is further to:
   receive a second memory access request that includes a second target address pointer indicating a second target metadata value and a second target linear address; and
   responsive to a determination that the second target metadata value and a second stored metadata value in the metadata data structure are not identical, prevent access to the second target linear address.

3. The apparatus of claim 2, wherein the metadata circuitry is further to, responsive to the determination that the second target metadata value and the second stored metadata value are not identical, generate a fault.

4. The apparatus of claim 1, wherein the target address pointer corresponds to an apparent address in an enhanced address space having a size that is greater than a size of the linear address space.

5. The apparatus of claim 1 wherein the metadata data structure is a two-level data structure.

6. The apparatus of claim 1 wherein the metadata circuitry is further to, responsive to the determination that the target metadata value and the stored metadata value are identical, modify the target address pointer to remove the target metadata value from the target address pointer.

7. The apparatus of claim 1 wherein the target linear address comprises 48 bits and the target address pointer comprises 64 bits.

8. An enhanced address space memory corruption detection method, comprising:
   receiving, via metadata logic, a memory access request that includes a target address pointer comprising a target metadata value and target linear address;
   comparing, via the metadata logic, the target metadata value to a metadata value stored in a metadata data structure at a location pointed to by at least a portion of the target linear address, the metadata data structure being included in a linear address space; and
   responsive to a determination that the target metadata value and the stored metadata value are identical, granting the memory access request to allow access to the target linear address.

9. The method of claim 8, further comprising receiving a second memory access request including a second target address pointer that indicates a second target metadata value and a second target linear address and, responsive to a determination that the second target metadata value and a second stored metadata value in the metadata data structure are not identical, preventing access to the second target linear address.

10. The method of claim 9 further comprising, responsive to the determination that the second target metadata value and the second stored metadata value are not identical, generating a fault.

11. The method of claim 8, wherein the metadata data structure is included in the linear address space, and wherein the target address pointer corresponds to an apparent address in an enhanced address space having a size that is greater than a size of the linear address space.

12. The method of claim 8 wherein the metadata data structure is a two-level data structure.

13. The method of claim 8 further comprising, responsive to the determination that the target metadata value and the stored metadata value are identical, modifying the target address pointer by removing the target metadata value from the target address pointer.

14. The method of claim 8 wherein the target linear address comprises 48 bits and the target address pointer comprises 64 bits.

15. An enhanced address space memory corruption detection system, comprising:
   a processor comprising at least one processor register;
   memory circuitry to provide a linear address space that includes a metadata data structure;
   metadata logic to receive a memory access request that includes a target address pointer comprising a target metadata value and target linear address; and
   metadata comparison logic to compare the target metadata value to a metadata value stored in the metadata data structure at a location pointed to by at least a portion of the target linear address;
   wherein the metadata logic is further to, responsive to a determination that the target metadata value and the stored metadata value are identical, grant the memory access request to allow access to the target linear address.

16. The system of claim 15, wherein the metadata logic is further to:
   receive a second memory access request that includes a second target address pointer indicating a second target metadata value and a second target linear address; and
   responsive to a determination that the second target metadata value and a second stored metadata value in the metadata data structure are not identical, prevent access to the second target linear address.

17. The system of claim 16 wherein the metadata logic is further to, responsive to the determination that the second target metadata value and the second stored metadata value are not identical, generate a fault.

18. The system of claim 15, wherein the target address pointer corresponds to an apparent address in an enhanced address space having a size that is greater than a size of the linear address space.

19. The system of claim 15 wherein the metadata data structure is a two-level data structure.

20. The system of claim 15 wherein the metadata logic is further to, responsive to the determination that the target metadata value and the stored metadata value are identical, modify the target address pointer to remove the target metadata value from the target address pointer.

21. The system of claim 15 wherein the target linear address comprises 48 bits and the target address pointer comprises 64 bits.

* * * * *